(12) United States Patent
De Peuter et al.

(10) Patent No.: US 8,677,446 B2
(45) Date of Patent: Mar. 18, 2014

(54) CENTRALLY MANAGED IMPERSONATION

(75) Inventors: Geert De Peuter, Turnhout (BE); David Solin, Austin, TX (US)

(73) Assignee: BMC Software, Inc., Houston, TX (US)

( * ) Notice: Subject to any disclaimer, the term of this patent is extended or adjusted under 35 U.S.C. 154(b) by 208 days.

(21) Appl. No.: 12/895,490

(22) Filed: Sep. 30, 2010

(65) Prior Publication Data

US 2011/0239275 A1    Sep. 29, 2011

Related U.S. Application Data

(60) Provisional application No. 61/318,162, filed on Mar. 26, 2010.

(51) Int. Cl.
*H04L 21/00* (2006.01)

(52) U.S. Cl.
USPC .............. 726/1; 726/2; 726/3; 726/4; 726/21; 726/27

(58) Field of Classification Search
USPC ......................................... 726/1, 4
See application file for complete search history.

(56) References Cited

U.S. PATENT DOCUMENTS

| | | | | |
|---|---|---|---|---|
| 6,364,834 B1* | 4/2002 | Reuss et al. | ................... | 600/300 |
| 7,065,784 B2* | 6/2006 | Hopmann et al. | ................ | 726/4 |
| 7,587,755 B2* | 9/2009 | Kramer | ............................. | 726/4 |
| 8,136,147 B2* | 3/2012 | Koikara et al. | ................... | 726/4 |
| 2002/0112186 A1* | 8/2002 | Ford et al. | ...................... | 713/201 |
| 2010/0257596 A1* | 10/2010 | Ngo et al. | ......................... | 726/7 |

\* cited by examiner

*Primary Examiner* — Kaveh Abrishamkar
*Assistant Examiner* — Tri Tran

(57) ABSTRACT

Systems, methods and computer readable media for centrally managed impersonation are described. Examples include a system having a central server and a remote shell daemon running on a remote machine, wherein a trust relationship is established between the central server and the remote shell daemon. Examples also include a method wherein a user sends the management system a request to act upon a remote machine. The management system determines whether the user is authenticated for the requested action. Upon authentication, the management system identifies an impersonation policy based on user profile and the remote machine. The management system connects to the remote machine, impersonates an elevated privilege account if required, and executes the user action on the remote machine.

21 Claims, 4 Drawing Sheets

CENTRALLY MANAGED IMPERSONATION

CROSS-REFERENCE TO RELATED APPLICATIONS

This application claims priority to U.S. Provisional Application Ser. No. 61/318,162 entitled "Centrally Managed Impersonation" filed Mar. 26, 2010, which is hereby incorporated by reference in its entirety.

BACKGROUND

This disclosure relates generally to the field of computer systems. More particularly, but not by way of limitation, it relates to a technique for improving impersonation management system.

In today's Information Technology (IT) environment, proper system access control is essential, not only from an operational perspective but also from compliance and audit perspective. Compliance requires that users are configured with "least required privileges". However operators in the systems management space often require access to more elevated privileges.

Systems like "sudo" allow local users on a machine to elevate their privileges. Through definitions installed in configuration files on the local machine, a user can temporarily impersonate another more elevated account to execute commands that require elevated privileges. The downside of this solution is that the files that enforce this elevation are locally managed, therefore introducing further managing, auditing and distribution of these rights. "Sudo" is by nature also not totally transparent. A user has to specifically "sudo"-execute a command in order to get access. A workaround for that problem can be achieved by installing wrapper commands in a location somewhere on the system and making sure that this location is specified in the PATH variable before the regular paths. That way, the operating system will execute the wrapper script instead of the real command.

These local configuration files and wrapper scripts are safe in the ideal world, but since they allow non-privileged users to elevate their privileges, it sometimes means that non-privileged accounts are as dangerous as privileged accounts. After all—user context switching is enabled 24×7 for anyone with local access to the machine. Even if a non-privileged account is compromised, this may result in some authorized actions by the compromised account, impersonating a privileged user.

Thus, it would be beneficial to provide a mechanism that centrally manages the impersonation to remote machines.

SUMMARY

Various embodiments disclose systems, methods and computer readable media that centrally manage impersonation which allows a user to impersonate another more elevated account to execute commands that require elevated privileges.

In one embodiment, a method is disclosed to centrally manage impersonation by an impersonation management system. The method comprises receiving a connection request from a user to a remote machine; authenticating the connection request; determining an impersonation policy for the user on the remote machine, wherein the impersonation policy identifies elevated privilege accounts associated with specific commands for a given user; sending the impersonation policy to the remote machine; sending user commands to the remote machine; possibly impersonating another user account on the remote machine; executing user commands on the remote machine; and returning a response to the user.

In another embodiment, another method for managing impersonation by an impersonation management system is disclosed. The method comprises accepting, at a remote machine, a connection request from a central server; receiving an impersonation policy; receiving a user command at the remote machine; determining whether the user command requires an elevated privilege to execute; identifying the elevated privilege based on the impersonation policy if determined; impersonating an account with the elevated privilege if identified; executing the user command; and sending a response to the central server.

In yet another embodiment, an impersonation management system is disclosed. The impersonation management system comprises a processor; an operator display, coupled to the processor; a storage subsystem, coupled to the processor; and a software program, application or module stored in the storage subsystem, comprising instructions that when executed by the processor cause the processor to perform the method described above.

In yet another embodiment, an impersonation management system is disclosed. The impersonation management system comprises a central server and a remote machine having a remote shell daemon running on the remote machine, wherein the central server comprises a processing unit configured to accept a request to act on the remote machine; an authentication unit, coupled to the processing unit, configured to manage access to the impersonation management system; an impersonation unit, coupled to the processing unit, configured to manage connections to the remote machine to impersonate an elevated privilege account; and a storage device, coupled to the processing unit, for storing configuration settings of the authentication unit and the impersonation unit.

In yet another embodiment, a non-transitory computer readable medium is disclosed. The non-transitory computer readable medium has instructions for a programmable control device stored thereon wherein the instructions cause a programmable control device to perform the method described above.

In still another embodiment, a networked computer system is disclosed. The networked computer system comprises a plurality of computers communicatively coupled, at least one of the plurality of computers programmed to perform at least a portion of the method described above wherein the entire method described above is performed collectively by the plurality of computers.

DETAILED DESCRIPTION

Figure 1:
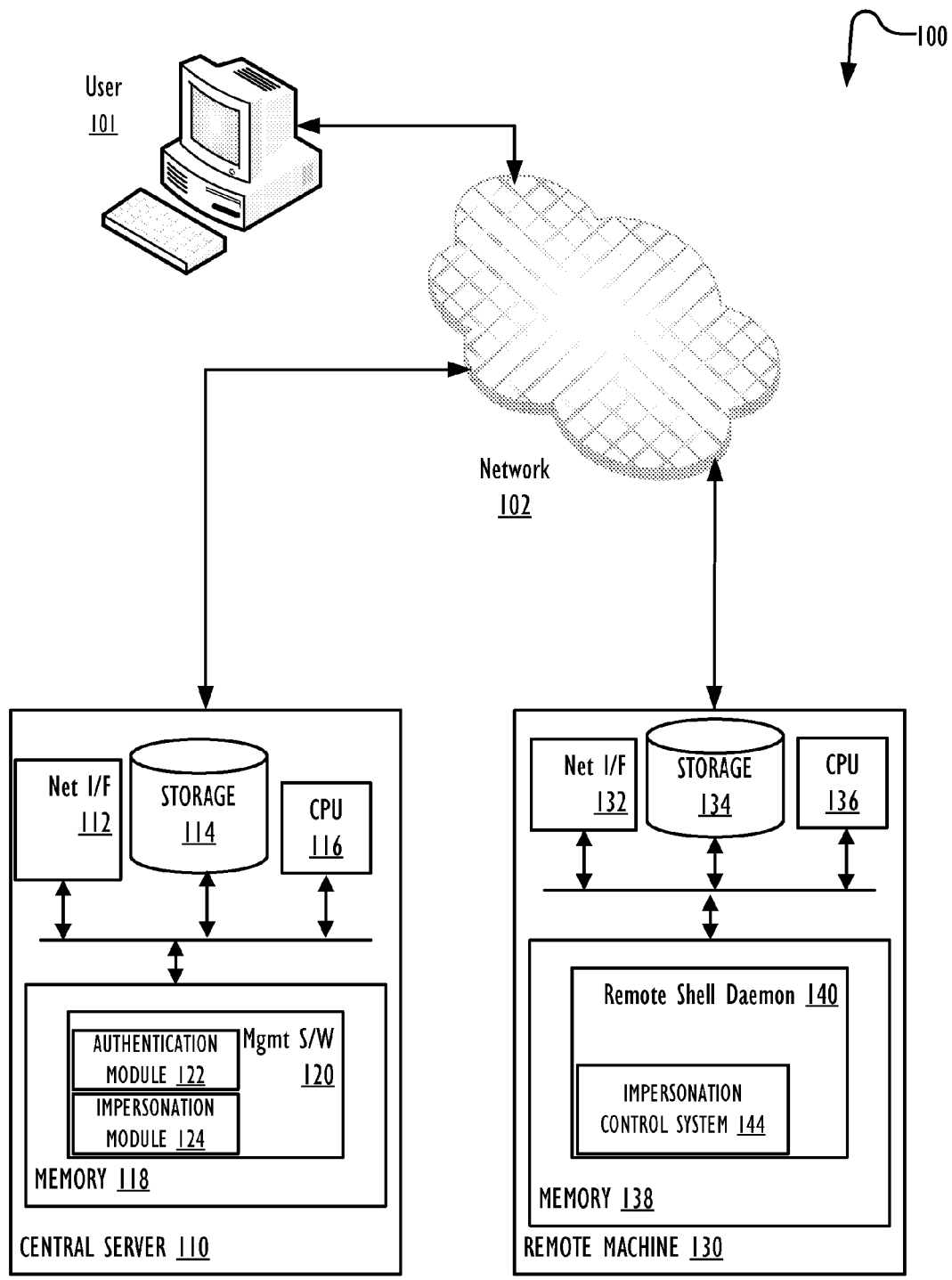
FIG. 1 illustrates an example impersonation management system that centrally manages impersonation according to one embodiment.

Various embodiments disclose systems and methods that provide a user the ability to transparently impersonate an elevated account to execute commands on a remote machine. Illustrative commands include, but are not limited to shutdown, reboot, kill, bind, rm, sync, fsck, etc. According to one embodiment, a user connects to a central server and requests a connection to a remote machine. The central server authenticates the user using authentication credentials, and determines an impersonation policy for the user to the remote machine based on the user's profile. An access control system may be used to manage the impersonation settings. The central server then creates a connection to the remote machine with the default privilege, relying on a trust relationship established between the central server and a remote shell daemon running on the remote machine. The central server then sends the impersonation policy and user commands to the remote shell daemon through the connection. The remote shell daemon parses the impersonation policy, and executes the user commands. If the user command requires an elevated privilege to execute, the remote shell daemon identifies whether the impersonation policy contains a record for that command. If an elevated privilege is identified, the remote shell daemon impersonates the elevated privilege account, and executes the command. A response is sent back to the central server for each command. If the command is executed with an elevated privilege, the central server logs the transaction. At the end of the session, the connection is closed, and data related to impersonation setting on the remote machine is removed.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

FIG. 1 illustrates an example of impersonation management system 100 that incorporates elements that enable system 100 to centrally manage the impersonation process. System 100 includes central server 110 coupled to network 102, which provides connectivity between central server 110, one or more users 101 and one or more remote machines 130. Such connectivity is provided via each system's network interface (e.g., network interfaces 112 and 132). Although example system 100 shows only one remote machine for simplicity purposes, any number of any of a wide variety of computer systems may be managed using the systems and methods described, including stand-alone computer systems, client computer systems and mainframe computer systems, just to name a few examples.

Example central server 110 may be implemented using any of a variety of known hardware platforms (e.g., Intel and Advanced Micro Devices processor-based personal computers) and known operating systems (e.g., Linux® and Microsoft Windows®). (LINUX is a registered trademark of Linus Torvalds. WINDOWS is a registered trademark of the Microsoft Corporation.) While such hardware platforms and operating systems may include many different constituent components or modules, only those components and/or modules that are relevant to the discussion of the centrally managed impersonation system are shown in FIG. 1 and described herein. Example central server 110 includes management software 120, which is loaded into memory 118 and executed by CPU 116, and which provides at least some of the impersonation management functionality described herein. Central server 110 also includes persistent storage device 114 (e.g., a hard disk drive), used to store configuration settings of management software 120, roles and rights for users 101, and impersonation settings for a user 101 and a remote machine 130.

As shown in FIG. 1, management software 120 includes authentication module 122 and impersonation module 124. Authentication module 122 authenticates a connection request from a user using authentication credentials, such as an application username and password. Impersonation module 124 determines the roles and rights applicable for the user, and determines an impersonation policy for the user with respect to remote machine 130. The management software also stores relevant information, such as the DNS name for each remote machine 130. The information for remote machines may be stored in persistent storage device 114.

As with central server 110, remote machines 130 may also be implemented using any of a variety of known hardware platforms (e.g., Cell, PowerPC® and UltraSPARC® processor-based blade servers) and known operating systems (e.g., AIX®, HP-UX® and Linux®). (POWERPC and AIX are registered trademarks of the International Business Machine Corporation. ULTRASPARC is a registered trademark of SPARC International, Inc. HP-UX is a registered trademark of the Hewlett-Packard Development Company.) Example remote machine 130 includes Remote Shell Daemon 140, which is loaded into memory 138 and executed by CPU 136. Central server 110 and remote shell daemon 140 have a trusted relationship established between them. Remote shell daemon 140 receives, via network interface 132, an impersonation policy and one or more user commands from central server 110. Remote shell daemon 140 includes an impersonation control system. Impersonation control system 144 determines whether elevated privileges are required to execute a command, and can impersonate an account with elevated privileges based on the impersonation policy. Remote shell daemon 140 can then execute the commands in either default account or in an impersonated elevated account.

Prior to a user connecting to central server 110, central server 110 and remote shell daemon 140 establish a trust relationship. The trust relationship between central server 110 and remote shell daemon 140 enables pass-through authentication of a user of central server 110 to remote shell daemon 140. A trust relationship may be setup using methods known in the art. For example, a trust relationship between the central server and the remote shell daemon may be established using Public Key Infrastructure.

Figure 2:
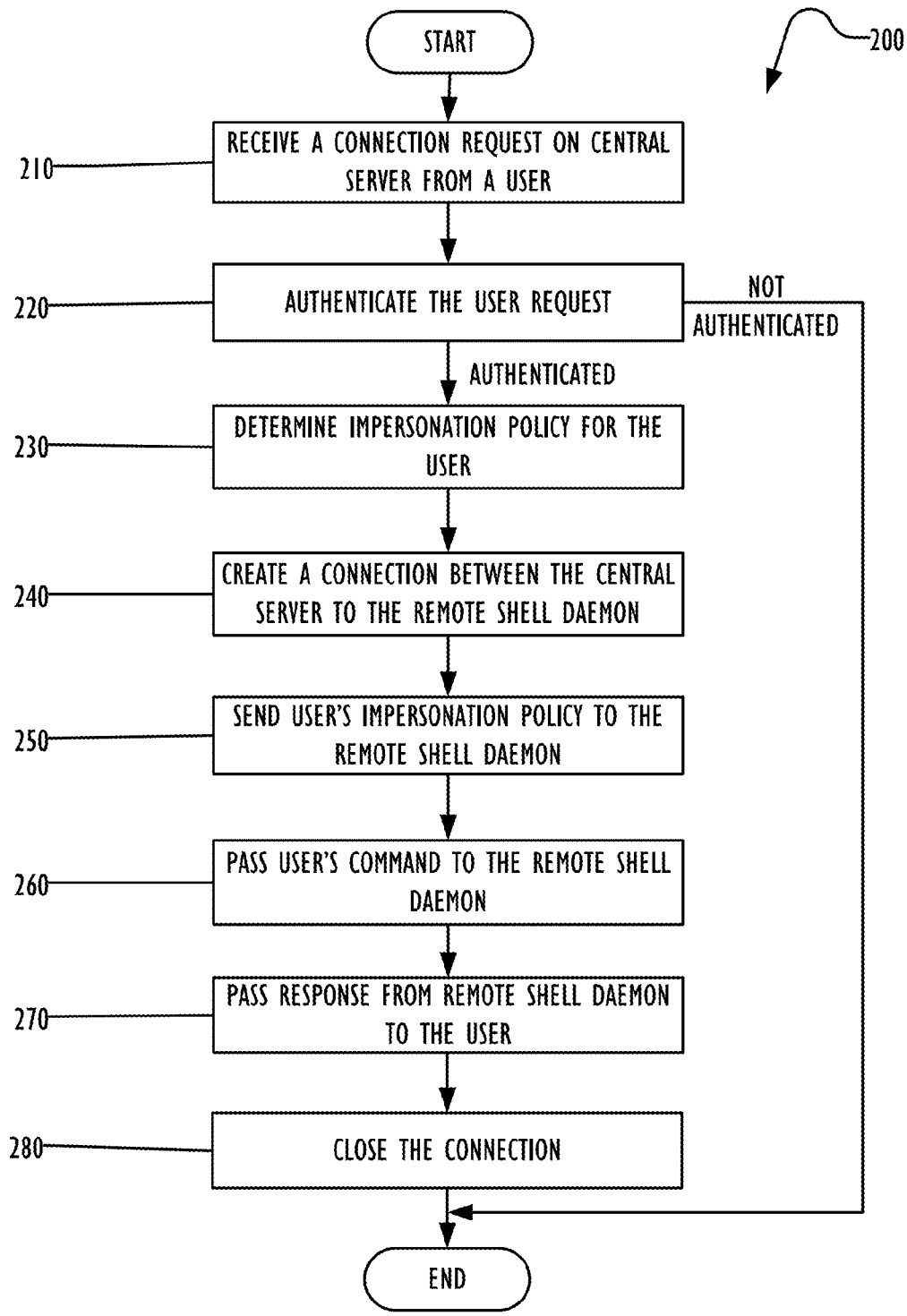
FIG. 2 illustrates, in flowchart form, a method for centrally managed impersonation at a central server according to one embodiment.

FIG. 2 illustrates one embodiment of method 200 for a central server to centrally manage impersonation. At block 210, a user connects to central server 110 and requests a connection to a remote machine (e.g., remote machine 130). As the central server receives the connection request from the user, authentication module 122 authenticates the user request at block 220. In one embodiment, the user may authenticate using authentication credentials, such as an application username and password. The authentication credentials may be stored in storage device 114. If user authentication fails, the central server refuses the connection request and sends a response back to the user, as shown in the "Not Authenticated" prong of block 220.

In the case where the user request is authenticated, as shown in the "Authenticated" prong of block 220, impersonation module 124 of management software 118 determines an impersonation policy for the user, block 230. The impersonation module determines the roles and rights applicable for the user. In one implementation, an access control system such as role based access control (RBAC) may be used to manage the roles and rights for users. The access control system may also include an impersonation policy for a user with respect to a remote machine. An impersonation policy for a user and a remote machine pair includes the default privileges the user may connect with and elevated privileges the user can inherit for specific commands on the remote machine. An impersonation policy may also include records having impersonation accounts with reduced privileges for some commands, including disallowing the execution of certain commands altogether. Based on the user's profile and connection request to a remote machine, impersonation module 124 may retrieve an impersonation policy for the user and the remote machine pair.

Central server 110 then creates a connection to remote shell daemon 140 on remote machine 130 as shown in block 240. Since there is a trust relationship between central server 110 and remote shell daemon 140, the new connection spawns a specific remote shell daemon instance which exposes the user to the default account. Once a connection is created, central server 110 can send the impersonation policy retrieved at block 230 to remote shell daemon 140, block 250. Central server 110 receives commands from the user and passes the commands to remote shell daemon 140, block 260. After remote shell daemon 140 executes the commands, central server 110 receives the response from the remote machine and passes the response to the user, block 270. Management software 120 may also create a record of the impersonation event in an impersonation event log, block 280. If the user logs out, or if the session times out, central server 110 can close the connection, block 290.

Figure 3:
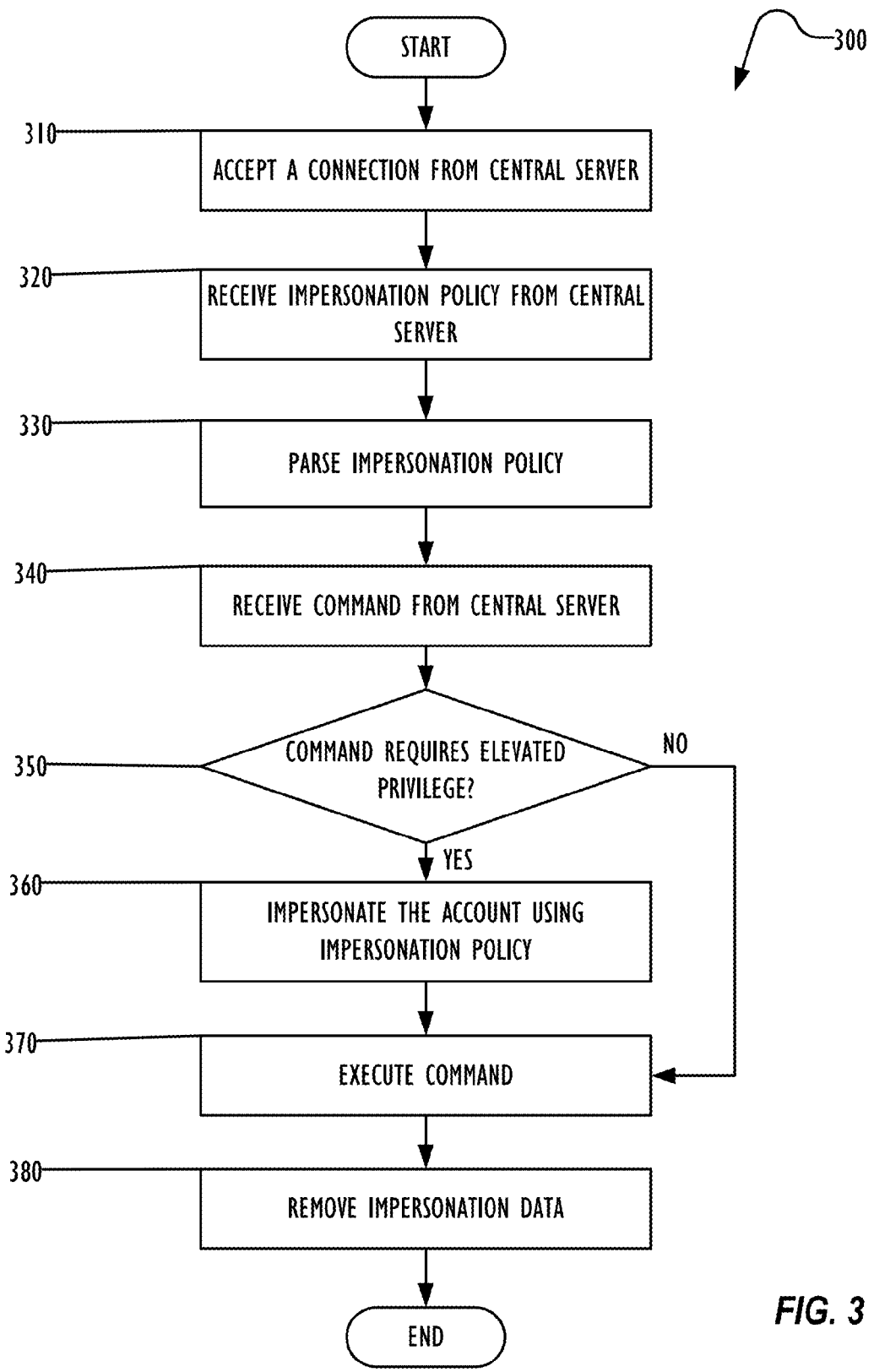
FIG. 3 illustrates, in flowchart form, a method for handling impersonation at a remote shell daemon installed on a remote machine according to one embodiment.

FIG. 3 illustrates one embodiment of method 300 for a remote shell daemon to centrally manage impersonation. At block 310, remote shell daemon 140 accepts a connection created by central server 110. After the connection is created, remote shell daemon 140 receives an impersonation policy sent from central server 110 as describe earlier at block 250 of FIG. 2. Remote shell daemon 140 then parses the received impersonation policy, block 330. As described earlier, the impersonation policy contains information about default privileges and elevated privileges for each command listed in the impersonation policy.

Remote shell daemon 140 can then receive commands from the user sent from central server 110 as described at block 260 of FIG. 2. Remote shell daemon 140 determines whether a command requires elevated privileges to execute, decision 350. If only default privileges are needed to execute a command, as shown in "No" prong of decision 350, remote shell daemon 140 executes the command, block 380. On the other hand, if executing a command requires elevated privileges, impersonation control system 144 will identify whether the impersonation policy contains a record for that command with an elevated privilege, block 360. If the impersonation policy does not include an elevated privilege for the command, the command is not executed, "No" prong of block 360. If the impersonation policy does include an elevated privilege for the command, impersonation control system 144 impersonates the account with elevated privileges, block 370. The command is then executed at the elevated privilege in accordance with the impersonation policy, block 380. If there are more commands received from the user, remote shell daemon 140 repeats steps laid out in blocks 340-380. At the end of the session, central server 110 may close the connection; remote shell daemon 140 may then remove all impersonation data from remote machine 130.

Figure 4:
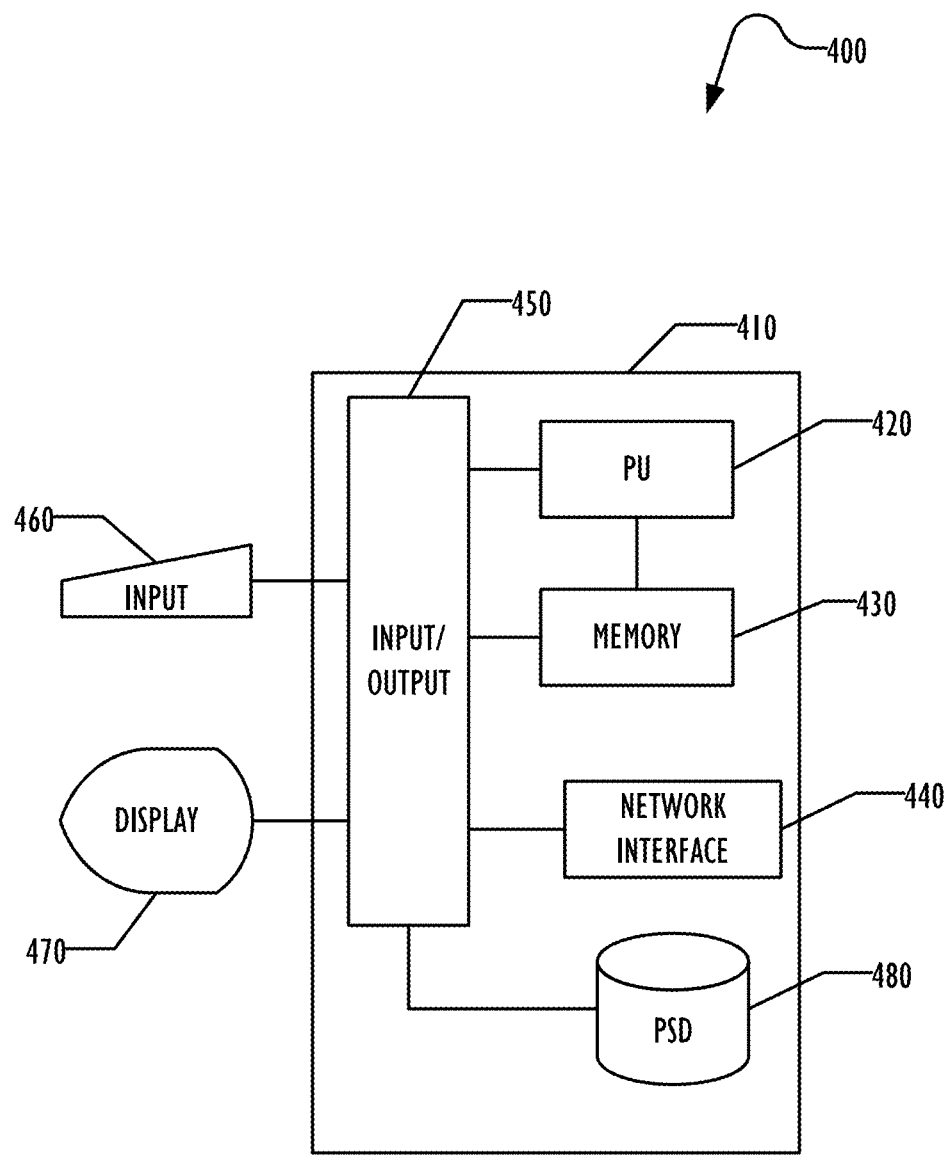
FIG. 4 illustrates, in block diagram form, an example computer system used for performing a technique for centrally managing impersonation according to one embodiment.

Referring now to FIG. 4, example computer 400 is shown. Example computer system 400 may be used as central server 110 of FIG. 1, and one or more example computer systems 400 may be used as remote machines 130 of FIG. 1. Example computer 400 comprises system unit 410 which may be optionally connected to input device 460 (e.g., keyboard, mouse, touch screen, etc.) and display 470. Program storage device (PSD) 480 is included with system unit 410. Also included within system unit 410 is network interface 440 for communication via a network with other computing and corporate infrastructure devices (not shown). Network interface 440 may be included within system unit 410 or be external to system unit 410. In either case, system unit 410 may be communicatively coupled to network interface 440. Program storage device 480 represents any form of non-volatile storage including, but not limited to, all forms of optical and magnetic storage, including solid-state, storage elements and removable media. Program storage device 480 may be used for storage of software to control system unit 410 in, data for use by the computer 400, or both.

System unit 410 may be programmed to perform methods in accordance with this disclosure (an example of which is shown in FIGS. 2 and 3). System unit 410 comprises processor unit (PU) 420, input-output (I/O) interface 450 and memory 430. Processing unit 420 may include any programmable controller device including, for example, one or more members of the Intel Atom®, Core®, Pentium® and Celeron® processor families from Intel and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 430 may include one or more memory modules and comprise random access memory (RAM), read only memory (ROM), programmable read only memory (PROM), programmable read-write memory, and solid-state memory. One of ordinary skill in the art will also recognize that PU 420 may also include some internal memory including, for example, cache memory.

In addition, acts in accordance with the methods of FIGS. 2 and 3 may be performed by example computer system 400 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Various changes in the components as well as in the details of the illustrated operational method are possible without departing from the scope of the following claims. For example, the illustrative system of FIG. 4 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." In addition, acts in accordance with FIGS. 2 and 3 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for managing impersonation by an impersonation management system having a central server and at least one remote shell daemon running on at least one remote machine, wherein the central server and the at least one remote shell daemon have a trust relationship, the method comprising:
   receiving, at the central server, a request action from a user requesting connection to the at least one remote machine, the request action including at least a first command and at least a second command;
   authenticating, at the central server, the user;
   retrieving, at the central server, an impersonation policy for the user to act on the at least one remote machine, the impersonation policy specifying first privileges for executing at least the first command on the at least one remote machine on behalf of the user and second privileges for executing at least the second command on the at least one remote machine on behalf of the user, the second privileges being different than the first privileges;
   connecting to the at least one remote machine including relying on the trust relationship between the central server and the at least one remote shell daemon running on the at least one remote machine;
   sending the impersonation policy for the user, including the first privileges and the second privileges, to the at least one remote shell daemon; and
   returning a response to the user, the response indicating execution, or lack thereof, by the at least one remote shell daemon of at least the first command and at least the second command, based on the first privileges and the second privileges, respectively.

2. The method of claim 1, wherein the act of retrieving an impersonation policy comprises retrieving a policy that defines one or more records, wherein each of the one or more records corresponds to at least one of the first and second commands and an elevated privilege account on the at least one remote machine.

3. The method of claim 1, wherein the act of retrieving an impersonation policy comprises retrieving a policy that defines one or more records, wherein at least one of the one or more records corresponds to at least one of the first and second commands and an account with reduced privileges on the at least one remote machine.

4. The method of claim 1 further comprising logging an impersonation event on the central server, if at least one of the first and second commands uses an elevated privilege to execute on the at least one remote machine.

5. The method of claim 1, wherein the act of connecting to the at least one remote machine comprises:
   creating a connection between the central server and the at least one remote shell daemon running on the at least one remote machine; and
   spawning a remote shell daemon instance where the user is connected through a default account.

6. The method of claim 1, wherein the act of authenticating the user includes authenticating user access to the at least one remote machine and determining, via an access control system, whether the user has access to the at least one remote machine.

7. The method of claim 6, wherein the act of determining whether the user has access to the at least one remote machine comprises using an application username and password.

8. The method of claim 6, wherein the act of authenticating the user includes authenticating user access to the at least one remote machine using the access control system including using a role based access control system.

9. The method of claim 1, wherein the first and second privileges for the first and second commands, respectively, include command-specific privileges for the user.

10. The method of claim 1, wherein:
    the first privileges for executing the first command specified in the impersonation policy include an elevated privilege for allowing execution of the first command by the at least one remote shell daemon running on the at least one remote machine, and
    the second privileges for executing the second command specified in the impersonation policy include a reduced privilege for disallowing execution of the second command by the at least one remote shell daemon running on the at least one remote machine.

11. The method of claim 1, wherein the impersonation policy includes default privileges for connecting to the at least one remote machine and elevated privileges for inheriting one or more commands on the at least one remote machine including at least one of the first and second commands.

12. The method of claim 1, further comprising:
receiving a response from the at least one remote machine for each of the first and second commands executed with an elevated privilege.

13. A method for managing impersonation by an impersonation management system having a central server and at least one remote shell daemon running on at least one remote machine, wherein the central server and the at least one remote shell daemon have a trust relationship, the method comprising,
accepting, at the at least one remote machine, a connection request for action from the central server on behalf of a user;
receiving, at the at least one remote machine, an impersonation policy specifying first privileges for executing at least a first command on the at least one remote machine on behalf of the user and second privileges for executing at least a second command on the at least one remote machine on behalf of the user, the second privileges being different than the first privileges;
receiving, at the at least one remote machine, a user action including at least one of the first command and the second command;
determining whether the user action requires an elevated privilege to execute at least one of the first command and the second command;
identifying the elevated privilege based on the impersonation policy if determined;
impersonating an account with the elevated privilege if identified;
executing the user action including at least one of the first command and the second command with the elevated privilege if identified; and
sending a response to the central server.

14. The method of claim 13 further comprising removing impersonation data from the at least one remote machine.

15. The method of claim 13 further comprising parsing the impersonation policy.

16. A computer system for managing one or more computer resources, comprising:
a processor;
an operator display coupled to the processor;
a storage subsystem coupled to the processor; and
a software module stored in the storage subsystem, the software module comprising instructions that when executed by the processor cause the processor to perform the method of claim 1.

17. A programmable storage device having programmed instructions stored thereon for causing a programmable control device to perform a method according to claim 1.

18. A networked computer system comprising a plurality of computers communicatively coupled, at least one of the plurality of computers programmed to perform at least a portion of the method of claim 1 wherein the entire method of claim 1 is performed collectively by the plurality of computers.

19. A networked impersonation management system, comprising:
a remote machine having a remote shell daemon running on the remote machine; and
a central server having:
a processing unit configured to accept a request to act on the remote machine, the request including at least a first command and at least a second command,
an authentication unit, coupled to the processing unit, configured to manage access to the impersonation management system,
an impersonation unit, coupled to the processing unit, configured to manage connections to the remote machine to impersonate an elevated privilege account based on an impersonation policy specifying first privileges for executing at least the first command on the at least one remote machine on behalf of a user and second privileges for executing at least the second command on the at least one remote machine on behalf of the user, the second privileges being different than the first privileges, and
a storage device, coupled to the processing unit, for storing configuration settings of the authentication unit and the impersonation unit.

20. The system of claim 19, wherein the authentication unit comprises a role based access control system.

21. The system of claim 19, wherein the remote shell daemon comprises:
a receiving unit configured to receive an impersonation policy and one or more user actions from the central server; and
an impersonation control system configured to impersonate as an elevated privilege account.

* * * * *